(No Model.)  2 Sheets—Sheet 1.

F. R. LOW.
STEAM ENGINE INDICATOR.

No. 350,069. Patented Sept. 28, 1886.

WITNESSES
J. M. Dolan
Fred. B. Dolan

INVENTOR
Frederick R. Low
by his attys
Clarke & Raymond (No Model.) 2 Sheets—Sheet 2.
F. R. LOW.
STEAM ENGINE INDICATOR.
No. 350,069. Patented Sept. 28, 1886.
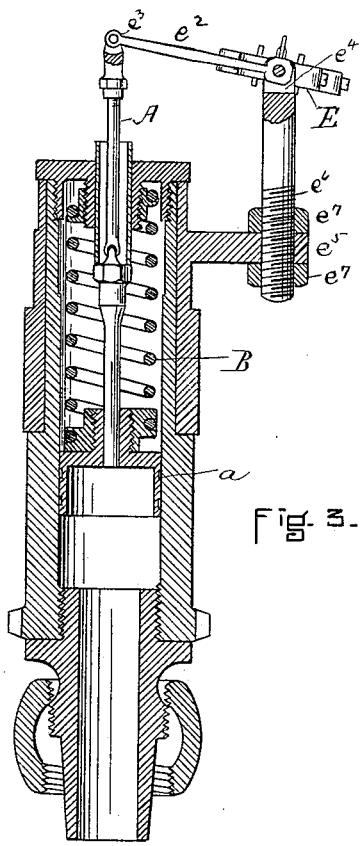
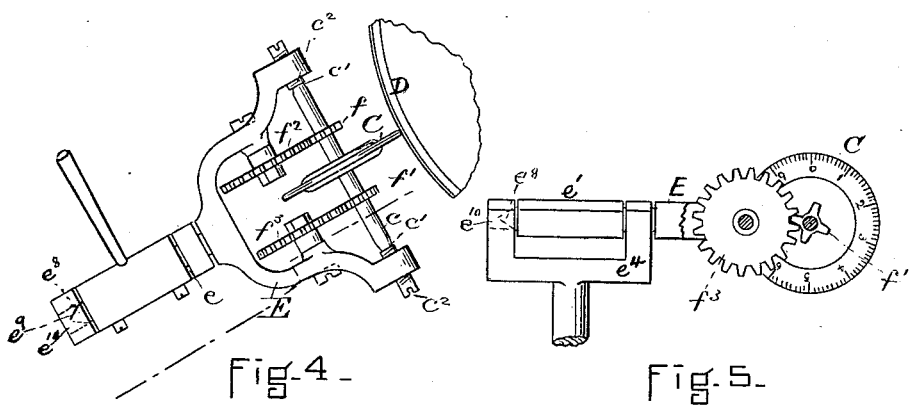
WITNESSES
J. M. Dolan
Fred. B. Dolan
INVENTOR
Frederick R. Low
by his attys
Clarke & Raymond

UNITED STATES PATENT OFFICE.

FREDERICK R. LOW, OF CHELSEA, ASSIGNOR TO THE ASHCROFT MANUFACTURING COMPANY, OF BOSTON, MASSACHUSETTS.

STEAM-ENGINE INDICATOR.

SPECIFICATION forming part of Letters Patent No. 350,069, dated September 28, 1886.

Application filed September 16, 1885. Serial No. 177,238. (No model.)

*To all whom it may concern:*

Be it known that I, FREDERICK R. LOW, of Chelsea, in the county of Suffolk and State of Massachusetts, a citizen of the United States, have invented a new and useful Improvement in Steam-Engine Indicators, of which the following is a full, clear, and exact description, reference being had to the accompanying drawings, forming a part of this specification in explaining its nature.

The ordinary steam-engine indicator of the market is employed to represent upon cards, by means of a pencil or marker, a diagram the outline of which indicates the variations from what is known as the "atmospheric line" to which the pencil has been previously set during one full stroke of the piston, and in order to estimate the work of the engine with any degree of accuracy it is necessary to take a large number of these cards and to afterward measure them, or obtain the contents thereof by a planimeter, and to make various deductions therefrom, all of which is tedious and not entirely practical for every-day testing.

The object of my invention is to provide an indicator with a planimeter-wheel which shall measure the work of the engine during its movement, and shall immediately indicate it, and without the use of a card. In other words, instead of using a pencil to mark upon the card the indicating-diagram, I employ a planimeter-wheel so mounted and operated that it shall indicate in proper terms the variations noted by the pencil and while the engine is in motion.

In carrying my invention into practical effect I use very largely the mechanism of the ordinary steam-engine indicator, simply substituting for the pointer and parallel-motion levers or arms the planimeter-wheel and holding device and suitable connection.

Figure 1:
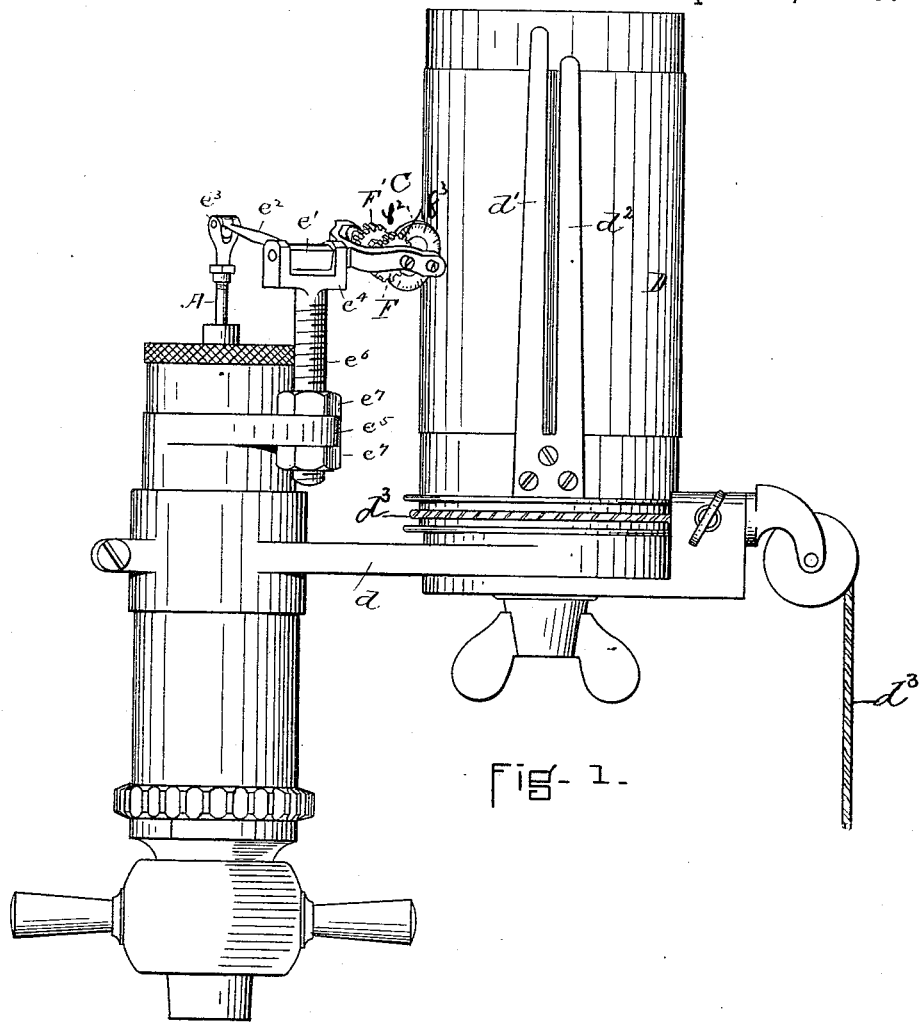
Figure 2:
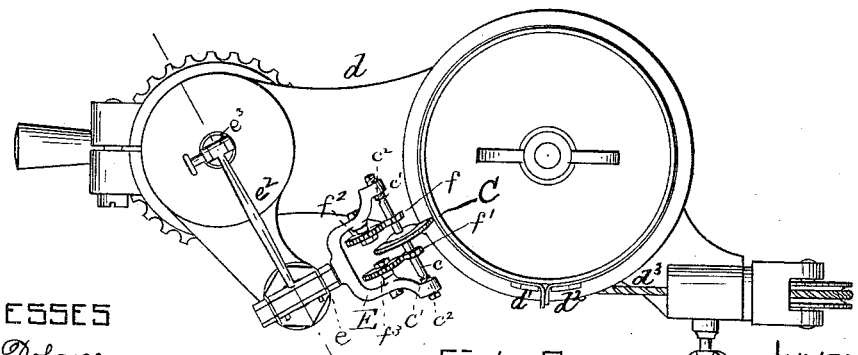

Referring to the drawings, Figure 1 represents a front elevation of my indicator. Fig. 2 is a plan view thereof. Fig. 3 is a vertical central section of the devices for operating the piston-rod. Figs. 4 and 5 are detail views which are hereinafter especially referred to.

The construction and mode of operation of the ordinary steam-engine indicator are so well known that it is only necessary to make brief allusion to a few of the principal parts herein referred to.

In the drawings, A represents the piston-rod; *a*, the piston; B, the balancing-spring.

In the ordinary steam-engine indicator the piston is balanced by the spring to place or bring the pencil at what is known as the "atmospheric line." In using this portion of an old mechanism for my device I follow, substantially, the same construction and method of adjustment. The piston-rod A, instead of communicating motion, however, to the pencil, is arranged to communicate movement to the planimeter-wheel C. This wheel is so hung in relation to the piston-rod that at atmospheric pressure its axis is parallel or upon the same plane as the plane or line of motion of the shell, drum, or moving device upon which it is arranged to bear, and which is moved by the piston.

In the drawings I have represented the card-carrier of the ordinary steam-engine indicator, which has a cylindrical shell, D, mounted upon a suitable bracket or arm, *d*, carrying card-holders *d' d²*, and revolved in one direction by the cord *d³*, connected with the piston or reciprocating part of the engine and revolved in the opposite direction by a spring. In use I mount a card upon this carrier, not because the wheel indicates any line thereon, but principally because it is desirable not to mark or deface the surface of the carrier; but I wish to say that it can bear against the carrier, if desired; and I would also say that any other form of carrier or any device having a substantially smooth surface actuated as the carrier is actuated may be used in lieu of the carrier herein described for the purposes of this invention. It will be seen that if the axis of the planimeter-wheel C is arranged so that the working edge of the wheel shall be at right angles to the line of movement of the carrying-surface the wheel will not be turned or revolved during this horizontal movement of the carrying-surface. If, however, the wheel shall be turned from this position either to one side or to the other, it will be revolved by the contact of the carrying-surface thereof, and if its axis is turned in one direction the movement will be forward, and if turned in the other it will be reversed. It will further be seen that this movement is graduated—that is, if the angle of deflection from a right angle is very slight, then the wheel is but slightly moved for a given extent of movement of the carrying-surface past it. If it is turned to a greater extent, then it is moved a greater portion of a revolution or number of revolutions for the same extent of movement of the carrier regardless of the rate of speed at which the carrier may travel. It will therefore be seen that if the planimeter-wheel be connected with the piston-rod A, the movements of the piston-rod will be communicated to it, so that it is turned from its normal position either one way or the other and at greater or less angles, according as the motion is communicated to it by the said piston-rod; and the same motions which with a pencil and the connecting devices used therewith produce a diagram upon a card, will, with the planimeter-wheel, indicate upon the planimeter-wheel the area or contents of the surface included in the diagram. I prefer to mount the planimeter-wheel upon a pivot, $c$, having tapering points $c'$, which enter sockets in the bearing pieces or screws $c^2$. This is for the purpose of hanging the wheel so that it may be turned with as little friction as possible. The bearing-pieces are supported by the yoke or arms E, which has a backward-extending shaft or pivot, $e$, extending into a block, $e'$, at the end of the connecting-rod $e^2$, which is connected at $e^3$ with the piston-rod A. The pivot $e$, block $e'$, and connecting-rod $e^2$ form together a rock-shaft. The block $e'$ has bearings in the post $e^4$, which is supported by the lug $e^5$, extending from the cylinder-casing. This post has a screw-thread, $e^6$, by means of which and the nuts $e^7$ it is vertically adjustable. I prefer that the pivot $e$ shall have a tapering end, $e^8$, to close into a piece, $e^9$, having the socket $e^{10}$ to receive the tapering end of the pivot, and this socket-piece is made horizontally adjustable in the block. This is for the purpose of permitting the movement of the yoke or arms E with as little degree of friction as possible. I have also shown upon the pivot carrying the planimeter-wheel two spur-gears, $f f'$, which engage with the gears $f^2 f^3$, mounted on the yoke or arms. These gears have upon their outer surface marks or lines or an indicating-surface, F F', and they serve to indicate in the proper units of measurement the area of the surface measured by the planimeter-wheel. It is necessary when these additional indicating-wheels are used to provide substantially the construction herein described, in order that the planimeter-wheel may be perfectly balanced.

I would say here that I do not confine myself to the specific manner of supporting or hanging the planimeter-wheel herein described, nor to the particular mechanism herein specified for connecting it with the piston-rod A, for there are other ways by which the same results may be obtained, and which I consider the mechanical equivalents of the devices herein specified.

In operation, if desired, the card is placed upon the card-carrier D, the planimeter set to atmospheric pressure, and upon the movement of the piston the carrier surface or card is moved by the planimeter-wheel, and as the piston-rod A is moved either up or down or is stationary the planimeter-wheel is caused to be moved or held stationary, as above described, in measuring the indicating area. Of course the planimeter-wheel is only stationary at atmospheric pressure, and of course if the piston indicates a vacuum the wheel is moved in a direction opposite to that which indicates pressure. The planimeter-wheel properly is of a size to indicate ten square inches to a revolution. It is obvious that by the continued reciprocation of the drum, cylinder, or movable surface about or past the planimeter-wheel, the wheel or indicator connected therewith will indicate the summation of the areas of all the cards which would have been made at each reciprocation of said surface and for the entire number of revolutions run, and it is possible, therefore, to ascertain immediately, by reading the indicator upon the planimeter-wheel or upon the wheels $f f'$, the average horse-power developed by an engine for every minute or other period of time that the engine is in operation.

Having thus fully described my invention, I claim and desire to secure by Letters Patent of the United States—

1. The combination, with a card-carrier, of an indicator, the planimeter-wheel C, piston A, yoke E, the block $e'$, the planimeter-wheel being journaled in said yoke and thereby connected with said block, the support $e^4$, and connecting-rod $e^2$, substantially as and for the purposes described.

2. The combination of a movable drum, means to move said drum about its axis, a rock-shaft adjacent to said drum, the axis of which is transverse to the axis of the drum, means to rock said rock-shaft actuated by the same prime mover as those which actuate the drum, but by an independent train, means for opposing a differential and cumulative resistance in one direction to the rocking of said rock-shaft, a planimeter-wheel mounted on the end of said rock-shaft with its axis of rotation transverse to the axis of rotation of the rock-shaft and normally at right angles to the axis of rotation of the drum, and with its surface in contact with the surface of the drum, all substantially as and for the purpose described.

3. An organized indicator consisting of the following parts: a spring-piston of usual construction, its piston-rod and link, a rock-shaft connected with said link and actuated by it, and carrying bearings on the end of its axis for a planimeter-wheel, a planimeter-wheel mounted on said rock-shaft with its axis transverse to the axis of rotation of the rock-shaft, and a usual reciprocating diagram, drum, or card carrier, substantially as and for the purpose described.

4. In an indicator, the combination, upon the end of the rock-shaft which is actuated by the movement of the pressure-weighing device of such indicator, of a planimeter-wheel mounted at right angles to the axis of reciprocation of the rock-shaft and normally at right angles to the axis of reciprocation of the diagram-drum, with the diagram-drum and rock-shaft to bear against said diagram-drum and register the areas of the power-diagrams continuously, substantially as described.

FREDK. R. LOW.

Witnesses:
F. F. RAYMOND, 2d,
J. M. DOLAN.